(12) United States Patent
Del Rey et al.

(10) Patent No.: US 7,103,556 B2
(45) Date of Patent: Sep. 5, 2006

(54) SYSTEM AND METHOD FOR AGGREGATE PORTFOLIO CLIENT SUPPORT

(75) Inventors: Bernard M. Del Rey, Chicago, IL (US); Mark R. Sheehan, Middletown, DE (US); Donald J. Weldon, Jr., West Chester, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/962,217

(22) Filed: Sep. 26, 2001

(65) Prior Publication Data

US 2004/0162773 A1    Aug. 19, 2004

Related U.S. Application Data

(60) Provisional application No. 60/244,914, filed on Nov. 2, 2000.

(51) Int. Cl.
*G06F 17/00* (2006.01)

(52) U.S. Cl. .............................. 705/1; 705/36
(58) Field of Classification Search ................ 705/36, 705/35, 37, 38, 1; 379/265
See application file for complete search history.

(56) References Cited

U.S. PATENT DOCUMENTS

| | | |
|---|---|---|
| 3,634,669 A | 1/1972 | Spontak |
| 4,598,367 A | 7/1986 | Freiman |
| 4,642,768 A | 2/1987 | Roberts |
| 4,736,294 A | 4/1988 | Le Grande |
| 4,739,478 A | 4/1988 | Finnerty |
| 4,831,526 A | 5/1989 | Luchs |
| 5,220,500 A | 6/1993 | Baird |
| 5,227,874 A | 7/1993 | Von Kohorn |
| 5,402,474 A | 3/1995 | Miller et al. |
| 5,481,647 A | 1/1996 | Brody |
| 5,523,942 A | 6/1996 | Tyler |
| 5,555,299 A | 9/1996 | Maloney et al. |
| 5,559,855 A | 9/1996 | Dowens et al. |
| 5,583,778 A | 12/1996 | Wind |
| 5,592,590 A | 1/1997 | Jolly |
| 5,594,791 A | 1/1997 | Szlam et al. |
| 5,611,052 A | 3/1997 | Dykstra |
| 5,649,116 A | 7/1997 | McCoy |
| 5,655,085 A | 8/1997 | Ryan |
| 5,675,637 A * | 10/1997 | Szlam et al. ........... 379/142.17 |

(Continued)

FOREIGN PATENT DOCUMENTS

JP    2005242976    * 9/2005

OTHER PUBLICATIONS

Asch, Latimer, How the RMAIFair, Issac credit-scoring model was built, Journal of Commercial Lending, vol. 77, No. 10, pp. 10-16, Jun. 1995.

(Continued)

*Primary Examiner*—Elisca Pierre Eddy
(74) *Attorney, Agent, or Firm*—Hunton & Williams LLP

(57) ABSTRACT

A system for facilitating client and advisor communications which may include a port to an aggregate database of a client's holdings and profile. When servicing or analyzing a client's financial needs, a financial advisor at a call center or other facility may be presented with a screen displaying some or all of the client's accounts, profile or analysis tools, collected via Internet or other sources. Other parties, including the client, may be offered access to the same, similar or related data and the financial advisor's analysis via a Web browser or other interface.

18 Claims, 9 Drawing Sheets

U.S. PATENT DOCUMENTS

| | | | |
|---|---|---|---|
| 5,684,870 A | 11/1997 | Maloney et al. | |
| 5,689,650 A | 11/1997 | McClelland et al. | |
| 5,717,865 A | 2/1998 | Stratmann | |
| 5,732,397 A | 3/1998 | DeTore | |
| 5,765,142 A | 6/1998 | Allred et al. | |
| 5,765,144 A | 6/1998 | Larche | |
| 5,774,878 A | 6/1998 | Marshall | |
| 5,774,883 A | 6/1998 | Anderson | |
| 5,852,811 A * | 12/1998 | Atkins | 705/36 |
| 5,875,437 A | 2/1999 | Atkins | |
| 5,884,032 A | 3/1999 | Bateman et al. | |
| 5,913,202 A | 6/1999 | Motoyama | |
| 5,920,848 A | 7/1999 | Schutzer | |
| 5,923,745 A | 7/1999 | Hurd | |
| 5,930,775 A | 7/1999 | McCauley | |
| 5,953,406 A * | 9/1999 | La Rue et al. | 379/265 |
| 5,963,635 A * | 10/1999 | Szlam et al. | 379/309 |
| 5,987,434 A | 11/1999 | Libman | |
| 6,018,722 A | 1/2000 | Ray et al. | |
| 6,073,105 A | 6/2000 | Sutcliffe et al. | |
| 6,100,891 A | 8/2000 | Thorne | |
| 6,101,486 A | 8/2000 | Roberts et al. | |
| 6,134,315 A | 10/2000 | Galvin | |
| 6,134,530 A | 10/2000 | Bunting et al. | |
| 6,170,011 B1 | 1/2001 | Macleod Beck et al. | |
| 6,175,563 B1 | 1/2001 | Miloslavsky | |
| 6,199,077 B1 * | 3/2001 | Inala et al. | 707/501 |
| 6,212,178 B1 | 4/2001 | Beck et al. | |
| 6,230,287 B1 | 5/2001 | Pinard et al. | |
| 6,233,332 B1 | 5/2001 | Anderson et al. | |
| 6,236,978 B1 | 5/2001 | Tuzhilin | |
| 6,301,351 B1 | 10/2001 | King | |
| 6,304,653 B1 | 10/2001 | O'Neil et al. | |
| 6,311,231 B1 | 10/2001 | Bateman et al. | |
| 6,327,359 B1 | 12/2001 | Kang et al. | |
| 6,327,574 B1 | 12/2001 | Kramer et al. | |
| 6,330,327 B1 | 12/2001 | Lee et al. | |
| 6,526,404 B1 * | 2/2003 | Slater et al. | 707/5 |

OTHER PUBLICATIONS

Taylor, Clair et al., Card Issuers Turn to Scoring as They Face Increasing Risk, Financial Services Report, vol. 8, No. 15, p. 1, Jul. 24, 1991.

Roger, John C. et al., A Credit Scoring Model to Evaluate the Credit Worthiness of Credit Card Applicants, Developments in Marketing Science, vol. 5, 1982.

Hickman, Michael, Using Software to Soften Big-Time Competition, Bank Systems & Technology, vol. 31, No. 8, pp. 38-40, Jun. 1994.

Sullivan, Deidre, Scoring Borrower Risk, Mortgage Banking, Vol. 55, No. 2, pp. 94-98, Nov. 1994.

Jameson, Ron, Expanding Risk Management Strategies: Key to Future Survival, vol. 84, No. 5, Credit World, pp. 16-18, May 1996.

Friedland, Marc, Credit Scoring Digs Deeper into Data, Credit World, vol. 84, No. 5, pp. 19-23, May 1996.

Credit Scoring New Markets, Bank Technology News, vol. 9, No. 7, p. 1, Jun. 1996.

Carey, James J., The Sub-Prime Credit Market: Identifying Good Risks for Unsecured Cards vol. 85, No. 1, Credit World, pp. 13-15, Sep. 1996.

Opportunity Knocks at Scoring's Door, Collection & Credit Risk, vol. 2, No. 4, Apr. 1997.

Makuch, Willaim J., Managing Consumer Credit Delinquency in the US Economy: A Multi-Billion Dollar Management Science Application, Interfaces, pp. 90-109, Feb. 1992.

Fred Fortner, There Must be a Better Way, Mortgage Banking vol. 53, No. 2, pp. 12-22, Nov. 1, 1992.

* cited by examiner

SYSTEM AND METHOD FOR AGGREGATE PORTFOLIO CLIENT SUPPORT

CROSS-REFERENCE TO RELATED APPLICATION

This application claims priority from provisional application Ser. No. 60/244,914, filed Nov. 2, 2000, which is incorporated by reference.

FIELD OF THE INVENTION

The invention relates to the field of customer support services, and in particular, to providing an automated, network tool to permit advisors at call centers and other facilities to manage financial and other client inquiries using a portfolio aggregator and related tools.

BACKGROUND OF THE INVENTION

In the financial services industry, the ability of an organization to provide enhanced customer service may be a valuable competitive advantage. Within the financial industry, certain categories of customers tend to have a range of financial needs and use a variety of financial vehicles to meet their needs. For instance, comparatively higher net worth individuals may maintain a number of cash, securities, insurance, credit and other accounts within a financial institution or from a number of institutions.

Financial advisors at call centers or other facilities asked to service that type of clientele may be hampered in their ability to service those relationships fully, because when a call or other contact arrives the financial advisor may only be able to pull up a single account related to that customer. More powerful support platforms are desirable. Other problems exist.

SUMMARY OF THE INVENTION

The invention overcoming these and other problems in the art relates in one regard to a system and method for aggregate portfolio client support in which a client's collective account holdings may be registered to an aggregate database. According to the present invention, the aggregate database may be maintained and updated for access by a financial advisor or other support personnel to give reports, run summaries, and provide projections and other financial advice on a portfolio basis. Other operations may also be performed. The client themselves may be given access to the aggregate database via a Web portal or other user interface. The client's portfolio information may be kept current using spiders, Web crawlers or other data feeds to the aggregate database, or using other techniques.

DETAILED DESCRIPTION OF THE PREFERRED EMBODIMENTS

The present invention provides a method and system for enhancing client-advisor relationships by providing the ability to aggregate reporting of various client financial accounts, a vehicle to perform advanced analysis and enriched reporting regarding client account information, and an online platform for communication between clients and advisors.

Account data aggregation of the present invention may include gathering, at an account holder's request or other authorizing event, account or other information from designated websites and other sources using the account holder's personal identification number ("PIN") or other form of authorization and making that user's account information available at a single website (or view) operated by the aggregator. For example, a user may provide the system with information related to various institutions (or other sources) at which the user has assets (e.g., accounts, stocks, personal property, non-financial assets, etc.). The user may also provide a user name (or other identifier) and a password (or other form of access or authorization). The system may then scrape the identified institutions to provide the user with a display of comprehensive aggregated data. The display may be an interactive display where the user may analyze, view, sort, modify and perform other operations related to the aggregated data. Automated as well as manual collection techniques may be used by the system to retrieve client asset information from different sources. Manual techniques may be performed by the client and/or the advisor on behalf of the client.

An enriched account data feature of the present invention may enable customization of information in a way that makes the data more easily understood and further enables users to define their financial picture more clearly.

An online platform for communication feature of the present invention may enhance client-advisor relationships where the ability to aggregate reporting of client financial accounts online and perform advanced analysis and enriched reporting around client account information may be provided. Client-advisor communications may be enhanced through various communication mediums, personalized alerts and other notifications of predefined triggering events that may be of interest to clients and/or advisors. In another example, communication may be established through a secure bulletin board (or other message environment). This feature enables advisors to view past and/or related correspondences to gain a comprehensive understanding of the client's situation and nature of the inquiry.

Figure 1:
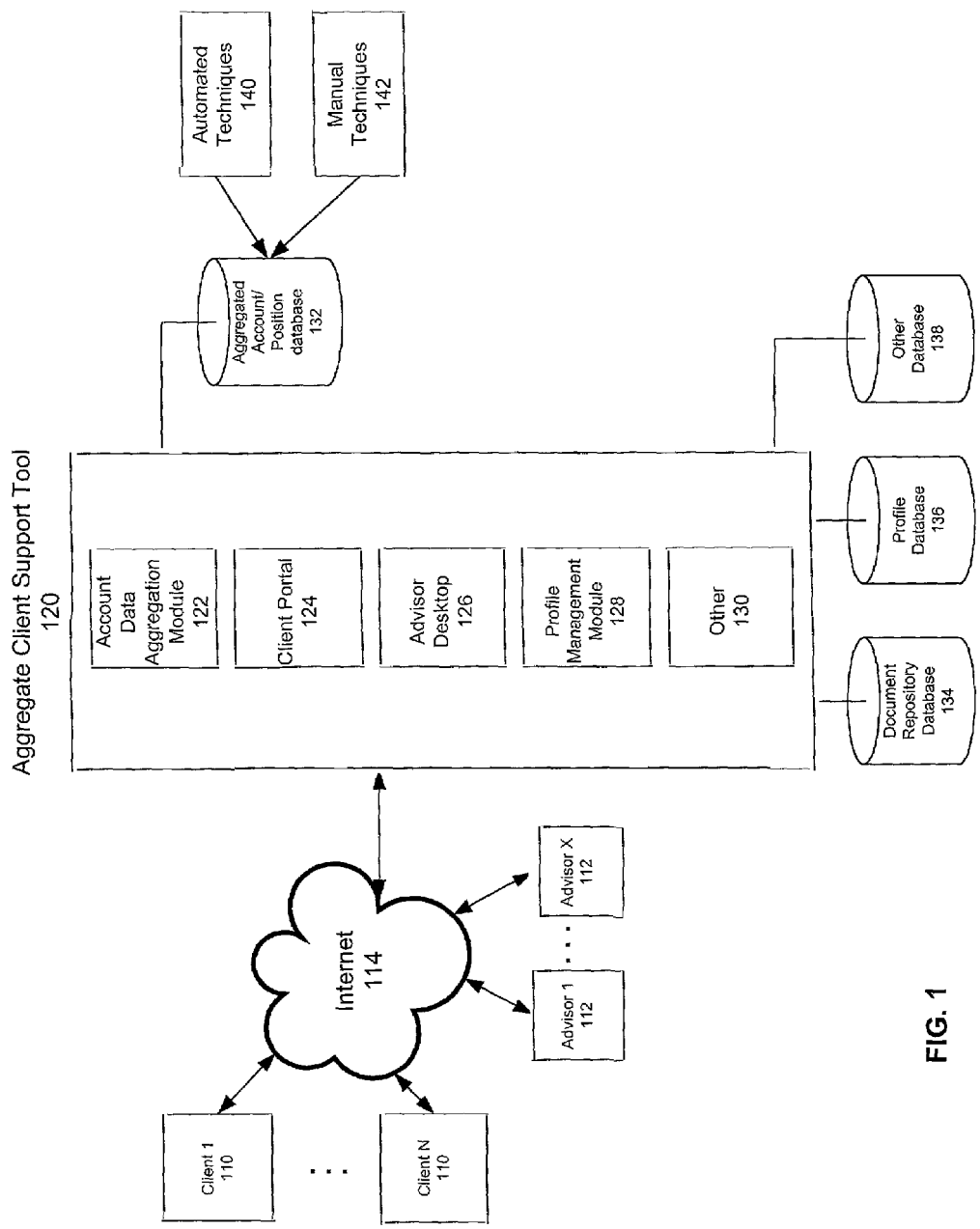
FIG. 1 is a diagram of an overall system, according to an embodiment of the present invention.

FIG. 1 is a diagram of an overall system, according to an embodiment of the present invention. One or more clients, as shown by $client_1$–$client_N$, may access aggregate client support tool 120 through Internet 114 or other mode of communication. Similarly, one or more advisors, as shown by advisor$_1$–advisor$_x$, may access aggregate client support tool 120.

An advisor may provide financial advice based on the client's comprehensive financial status, which oftentimes may include more than one account and other forms of assets (e.g., securities, bonds, property, etc.). The aggregation feature of the present invention enables advisor and clients to analyze and view relevant information for some or all accounts and assets associated with a particular client. Thus, the present invention enables clients and/or advisors the ability to view comprehensive financial data associated with a particular client where the comprehensive financial data may be customized for detailed analysis and insight. Aggregated data may be enhanced and/or enriched by the present invention for better understanding of a client's overall financial situation.

Aggregate client support tool 120 of the present invention enables further advisors and clients to effectively communicate through a common tool. For example, an advisor and client may share documents and other material through a document sharing feature of the present invention. In addition, message posting, conference, chat and other forms of communication may be available through the communication feature of the present invention.

Further, a client may have access to a personalized client portal where relevant information may be presented to the client, based on a client's profile, transactions and other personalized information. Alerts and/or other forms of notification may be applied to various client defined triggering events.

Advisors may correspond to a particular client or send broadcast type communications to some or all clients associated with the advisor. Advisors may also provide research and analysis through account queries applied to a client's aggregated account data where aggregated account data may be examined based on various predetermined and/or customized factors. Other account management tools may also be available to an advisor.

Aggregate client support tool 120 may provide various services, modules, functions, and access to information. For example, aggregate client support tool 120 may include account data aggregation module 122, client portal 124, advisor desktop 126, profile management module 128 and other module 130. In addition, access to information may be available through aggregated account/position database 132, document repository database 134, profile database 136 and other database 138. Aggregated account/position data may be stored and gathered by various methods, such as automated techniques 140 (e.g. web crawlers, web spiders, etc.) or manual techniques 142. Other methods may be used. Information may be stored in a single database or separate databases. Other variations may be implemented.

According to an embodiment of the present invention, aggregate client support tool 120 may enable advisors or other authorized entities to access profile database 136 to service clients. In particular, a client may not be required to subscribe or register with the services of the present invention for one or more authorized advisors to access and aggregate client data. Profile data may be supplied by customer data gathered from other channels where the customer may be registered. Other sources may also provide client data. According to this embodiment, advisors may service clients without a client request for services or other direct client contact. This embodiment may enable advisors to proactively service clients based on profile data submitted or otherwise gathered through another channel or other source.

According to an operation of the invention, a financial or other client may access a call center, initiate an Internet telephony session, transmit email via the Internet or other network, engage in online messaging or other contact with a service facility to inquire about account and other information. If using the Internet or other network, the client may, for instance, enter via a Secure Socket Layer ("SSL") or other secure mechanism. In an embodiment of the present invention, the client may be authenticated using a PIN, a password, biometric or other information.

An advisor receiving and servicing the contact may operate an advisor workstation, for instance, to retrieve and be presented with information from the aggregate and other database(s). The advisor workstation may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform.

The presentation to the advisor may include, for instance, tables, menus, screens or other graphics to display account balances, net worth information, account holdings by asset, sub asset or class, account maintenance information or other defined sets or subsets of account information.

The invention in one regard relates to a system and method for aggregate portfolio client support in which one or more of a client's holdings and/or other identified information may be collected for analysis, presentation and service. The types of accounts or holdings which may be registered and stored in the aggregate database may be or include, for instance, cash accounts, demand deposit accounts, checking accounts, savings accounts (e.g., money market, certificate of deposit, etc.), credit card accounts, loan accounts, investments accounts (IRA, mutual funds, etc.), brokerage or other securities accounts, mortgage accounts and others. In addition, non-financial assets as well as real estate, personal property (e.g., artwork, antiques, jewelry, etc.) and other items of worth may be collected. Ownership (e.g., full or partial ownership) in a company, future interests and other intangibles may be included. Other information may also be gathered by the present invention.

According to an embodiment of the present invention, an aggregate database may, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention. The aggregate database may be housed locally or remotely, for instance, in a secure, scalable facility. For security and reliability, redundancy may be employed in the aggregate database.

The present invention may include a hosted data repository and various applications to provide a client with a consolidated view of the client's entire financial portfolio. Financial as well as other types of information may be aggregated according to the present invention. The present invention provides an enriched account data platform where account and other information may be customized and presented to the client so that the client may view and analyze a comprehensive depiction of the client's entire financial situation.

A client may include an individual with various accounts and/or financial items. A client may also include an entity, such as a business, corporation or other entity with various accounts and financial items.

Figure 2:
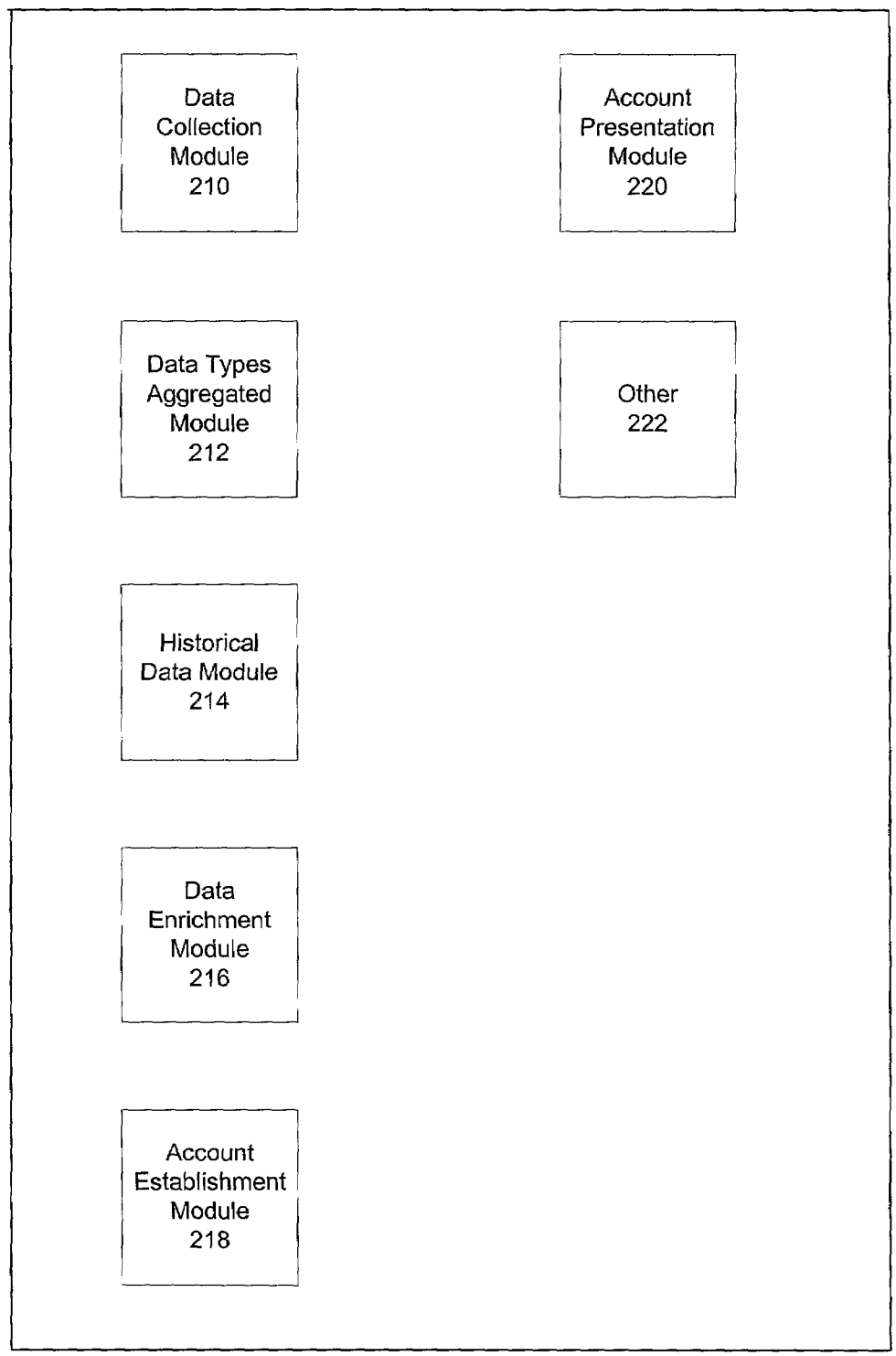
FIG. 2 is an example of an account data aggregation module, according to an embodiment of the present invention.

Upon subscription with an account aggregation system of the present invention, a client's accounts may be entered into an aggregate database for maintenance, access, analysis, presentation and other operations. FIG. 2 illustrates an account data aggregation module 122, which may provide various features, such as data collection module 210, data types aggregated module 212, historical data module 214, data enrichment module 216, account establishment module 218, account presentation module 220 and other modules and features, as shown by 222.

Account data aggregation module 122 may collect client information, manage the collected information and prepare the collected information for presentation to the client and/or other authorized entity.

Data may be collected through various techniques via Data Collection Module 210. For example, data collection may involve collecting client information by "scraping" client data from previously established online accounts and converting the images into data. For example, the account information may be entered into the aggregate database using automated techniques such as Web spiders or Web crawlers configured to locate and enter various financial services Internet sites and transmit updated account information to an aggregate database.

The present invention further enables the client to manually enter account information. For example, the account information may be entered using manual techniques by a financial advisor, account manager or other authorized entity on a periodic, ad hoc or other basis.

Data collected may be updated automatically or manually. For example, client information may be updated automatically at periodic intervals. A user (e.g., client) may also request an update of specific account information at any time through an update button, for example, for an individual account. In another example, manual account information may be updated by an associated client.

Account data aggregation module 122 may aggregate various types of accounts, as illustrated by Data Types Aggregated Module 212. Through Data Types Aggregated Module 212, a client (or other user) may identify accounts to be aggregated by account type. For example, accounts that may be aggregated by the present invention may include various combinations of checking, savings (e.g., money market, certificate of deposit, savings, etc.), investment accounts (e.g., brokerage, IRA, mutual funds, etc.), loan accounts, credit card accounts, merchant accounts and other account types. Account data aggregation module 122 may collect various information associated with the aggregated account types, such as summary balances, detailed positions (e.g., units, price, value, etc.), recent transaction history and/or other information.

According to another embodiment of the present invention, predefined account structures may be provided for certain account types, such as banking, investment, credit and others. Other account types may be manually entered thereby allowing any type of asset, liability or account to be entered and aggregated by the present invention. For example, some account types may need or require detailed description, units and values, for example. These account types may be manually entered. Also, position detail types may be entered and access. Position detail types may include equities, bonds, mutual funds, cash, personal property, credit and other assets.

The aggregation feature of the present invention may further capture and maintain historical client transaction and other data through Historical Data Module 214. Historical data may include past transactions associated with aggregated accounts or individual accounts, for example. Past performance history may also be available for securities and other earnings events. Other historical may also be displayed to the client for analysis and interpretation, based on various user defined factors. Historical data associated with selected aggregated accounts (and/or other data) may be displayed to the client for analysis of performance, accuracy and/or other metrics.

Data enrichment may also be available through the aggregation feature of the present invention at 216. Aggregated data, derived from a client's accounts and/or other sources of client financial data, may be customized based on user defined factors to enable a client to assess comprehensive financial status and other information. Graphical displays and other various formats may be used to display aggregated data to clients and other authorized users for analysis and understanding. Other information of interest to a client may be determined and displayed to the client through the present invention.

Data enrichment may also provide supplemental information associated with a client's accounts and other sources of financial data. For example, the present invention may enrich exchange listed securities in a client's account with additional market information to provide the client with better knowledge of the client's accounts. In another example, data enrichment may provide intra-day pricing on applicable or selected exchanged listed securities. In addition, positive gains and negative losses may be color coded (e.g., green for gains, red for losses). Other indicators may be displayed.

Thus, fundamental information about each exchange listed security may be provided through Data Enrichment Module 216. For example, a calendar of financial events for one or more exchanged listed security that may be of interest to the client may be displayed. Financial data of interest to a particular client may be determined by whether the data is part of the client's portfolio. A client may also specify (or select) financial data of interest. General financial data of importance may be displayed to a group of applicable clients. Other methods of determining enhanced or supplemental data may be utilized.

In another example, asset classifications may be defined for consistent treatment of securities across multiple accounts. In addition, each financial institution may provide its own security master for consistent asset classification. A securities table with sub assets and securities may be provided on a periodic or other basis, such as every quarter. Other forms of data enrichment may be implemented.

Figure 3:
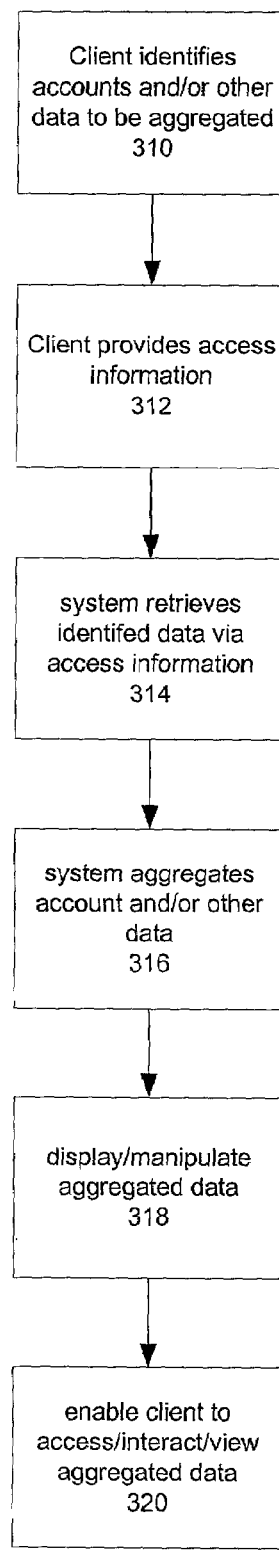
FIG. 3 is a flowchart illustrating an account establishment process, according to an embodiment of the present invention.

Account Establishment Module 218 may enable each client (or user) the ability to establish the client (or user) and associated accounts for the aggregation feature of the present invention. FIG. 3 is a flowchart for illustrating a process for establishing accounts for aggregation, according to an embodiment of the present invention. At step 310, a client may identify one or more accounts and/or other sources of data to be aggregated through the present invention. Identification information may include account number, the identity of the establishment holding the account (e.g., bank name, etc.), security information, investment information and other identifying data. At step 312, the client may provide access information, such as a PIN number or other information that may be used to access the client's account and/or other data. In addition, the client may be prompted to provide other personal and/or account information. At step 314, the system of the present invention may retrieve account data for each identified account via the client's access information for the identified account. Other information may also be retrieved through the present invention. At step 316, the present invention may aggregate the data associated with the identified accounts. At step 318, the aggregated data may be displayed to the client according to various client defined specifics. The aggregated data may be further enhanced in accordance with the present invention. At step 320, the client may access, interact, view and perform other operations to the aggregated data.

Figure 4:
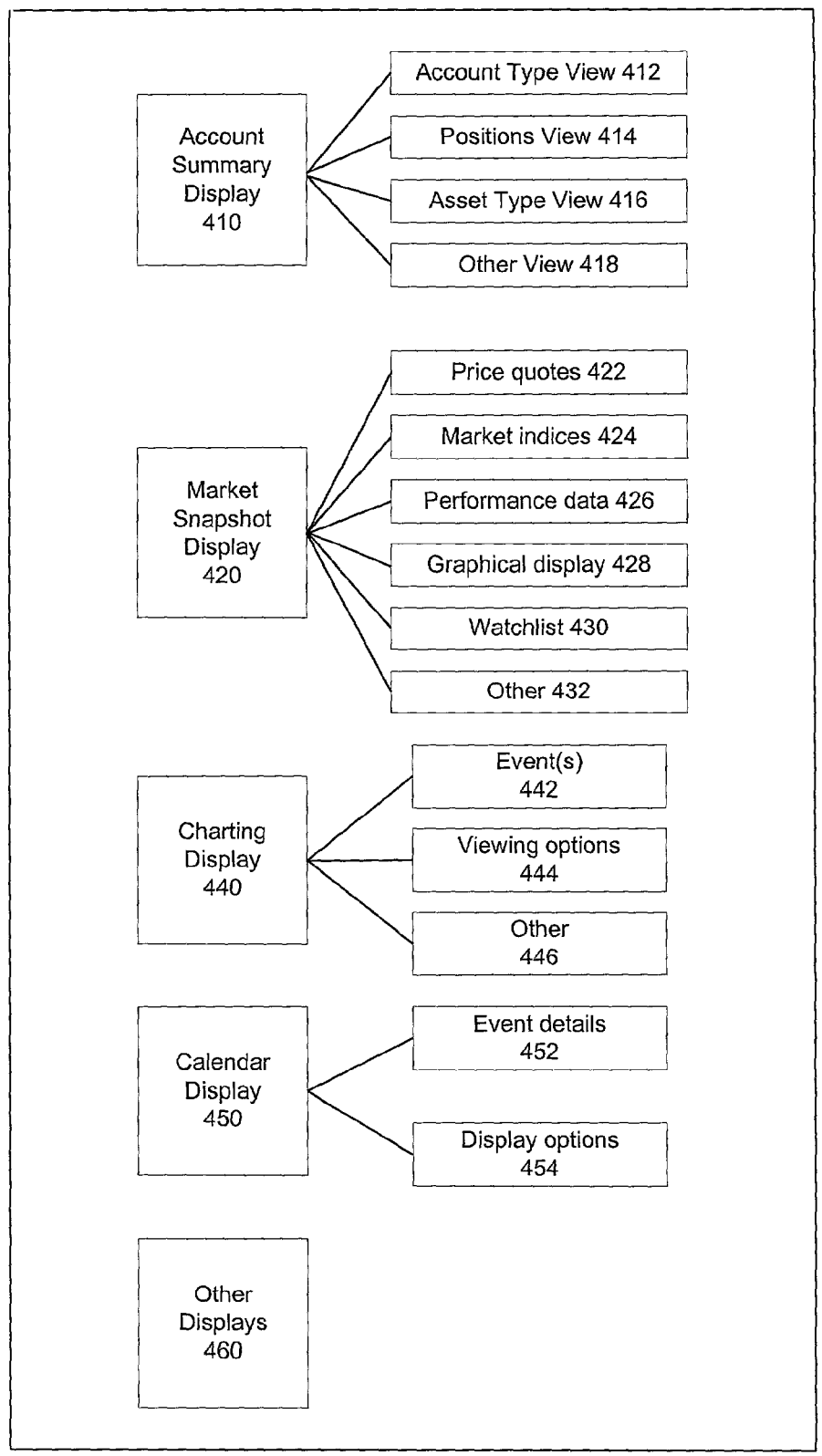
FIG. 4 is an example of an account presentation module, according to an embodiment of the present invention.

FIG. 4 illustrates the various modules of an account presentation feature of aggregated data, according to an embodiment of the present invention. Account presentation may provide user interface and navigation options through aggregated and other data. Account presentation module 220 may provide various displays, such as account summary display 410, market snapshot display 420, charting display 440, calendar display 450 and other displays, as shown by 460. Display options may include client defined display specifications and default display specifications, for example.

Account summary display 410 may present a client's aggregated accounts with various account information and characteristics, such as subtotals by account types, total net worth and other factors. Account summary information may be displayed in various formats and views, which may include an account type view 412, a positions view 414, and an asset type view 416. Other views 418 may also be available.

The present invention may aggregate various types of accounts. For example, account types may include banking, investment, credit and other account types. Account type view 412 may include various information, such as one or more of account name, financial institution from which account data is collected, account description, manual/electronic flag, balance/value information, last updated date/time stamp, view transaction information, update data and other information.

For example, manual/electronic flag may include a symbol or other identifier indicating to the user whether accounts are aggregated accounts or manually entered accounts. Other types of accounts and combinations may be symbolized or otherwise flagged.

Balance/Value information may represent the balance or value of a selected account (or source) as of the date the account information was updated or other specified period of time. Other information may also be available.

Last updated date/time stamp may indicate to the user when the account (or source) was last modified or refreshed. Other triggers may be defined and applied as well.

View transaction information may link the client to detailed transactional history of one or more selected accounts (and/or other sources). The present invention may provide the account history and other information that may be available from a financial institution (or other source). The client may manually input the transaction if so desired.

Update data enables the client to update the account data. For electronic accounts, a connection may be opened to the source of account information where the account information may be refreshed with current or new information available from a source institution or other source. For manual accounts, an account maintenance window may be opened to allow the user to modify the account level data. Other operations and views may be available.

For example, accounts that may be entered manually and do not have an asset that may be automatically priced (e.g., exchange listed security), may be displayed with the date the information was entered in the system of the present invention. In another example, accounts entered manually that have an exchange-listed security associated with them that can be priced, may be displayed with the latest price upon an action or event (e.g., page refresh).

Also, manual accounts that may contain positions with As-Of prices from different dates may contain a flag (or indicator) at the account summary level indicating an occurrence (e.g., that an inconsistency in overall account value may exist). The flag (or indicator) may indicate to the user that an account position view may be accessed to provide detailed information for further examination. Other information may be displayed and other triggering events may be identified.

The user may access an account position view to analyze detailed data regarding the user's accounts and/or other sources of financial and other data. Positions view 414 may provide detailed positions of a selected one or more accounts (and/or sources). Positions information may include one or more of asset name, identifier (e.g., stock symbol, CUSIP, etc.), asset description, number of units, as of date price (e.g., latest closing price retrieved), as of date timestamp, as of date value (e.g., number of units multiplied by as of date price), current price (e.g., intra day price), current price timestamp, asset price direction (which may be measured from close of previous day or other time frame), price change (which may be measured from close of previous day or other time frame), current value (e.g., number of units multiplied by current price) and other information.

Asset type view 416 may enable a user to view the user's portfolio by asset type. Other viewing criteria may be specified. The asset type may include one or more of equities, bonds, mutual finds, cash, personal property, credit and other assets. The asset type view may display for each asset or group of assets one or more of asset description, account description, units, price, value and other information.

Asset description may include one or more of stock symbol, fund symbol, CUSIP, property location, and other information, attributes and characteristics. For example, each stock symbol (e.g., exchange listed security) may provide one or more of the security's fundamental information, a financial calendar for that company, positions held by that client in that security, the client's transaction history with that security, any notes or alerts that the client may have defined regarding the security and other information.

Value information may include the current market price of the asset. If the asset value is available through intra day pricing, then the value of the asset may be the number of units (from the last date the account information was updated) multiplied by the price. Other calculations may be implemented as well.

In addition, clients may add, modify, delete one or more accounts through account summary display 410, for example. Other operations may also be performed. The client may also edit manual accounts through the account summary display. Manual accounts may also be added, modified and deleted. Restrictions may be applied as well. For example, a client may not be permitted to edit information that may be collected by aggregators.

A graphical representation of a client's accounts and related information may be displayed in various forms, e.g., pie charts, graphs, charts, etc. For example, one view may present high level asset allocation across account types.

Another view may provide a detailed asset allocation view that may utilize a security master lookup to classify the asset type. Other operations may also be available.

Market snapshot display 420 may provide clients (or other users) with an overview of the entire market performance as well as customized portfolio information. For example, market snapshot 412 may provide various customizable functionalities, such as price quotes 422, market indices 424, performance data 426, graphical display 428, customizable portfolio watch list 430 and other information 432.

Price quotes, which may be delayed by a predetermined period of time, may be displayed for a security or groups of securities. A client may enter ticker symbols or perform a ticker symbol lookup. Price (or stock) quotes 422 may provide the exchange listed security's fundamental information, a financial calendar for that company, positions held by that client in that security, the client's transaction history with that security, as well as any notes or alerts that the client may have set for that security. Other information may also be displayed.

Current major market indices 424 may include Dow Jones, NASDAQ, S&P 500, NASDAQ 100 and other sources. For example, the present invention may aggregate a client's stock portfolio where the price of shares may be contemporary and currently updated to reflect the most recent price (or other form of valuation).

Performance data 426 may include a best and/or worst performers section where equities present in an individual's portfolio may be analyzed to summarize the top performers in each category. Various criteria and/or factors for performance analysis may also be indicated, such as accuracy, reputation, profitability, etc.

Graphical display 428 may provide pictorial summary of indices of user defined performance metrics, such as best and/or worst performers. When an index or security in the best/worst list is highlighted (or otherwise selected), the graph may display related price history and other historical data. Various time periods may also be defined or selected for comparison and analysis.

A customizable portfolio watchlist may default to the securities in a client's aggregated account. In addition, the client may modify the securities in a watchlist by adding, deleting, and modifying other securities, events and triggers. Watchlist 430 may display various types of data, including one or more of color coded stock symbols, current price data, dollar change, percent change, alert and notes indicators and other information. Various watchlist options may include the ability to set price alerts for an individual entry in the portfolio watchlist, the ability to write notes containing personal information regarding an individual security and other capabilities and options.

For example, a stock symbol may display a predetermined color or symbol (e.g., green) if the asset has increased in value for a time period (e.g., a day), or a different color or symbol (e.g., red) if the asset value has decreased in value for the time period, (e.g., that day). The stock symbol may also provide a link to information, which may include security's fundamentals, the financial calendar for that company, positions held by that client in that security, transaction history, applicable notes and alerts and other information.

Charting display 440 enables a client to graphically view a security's pricing history and/or historical information, such as accuracy and performance metrics. A client may select to view a single security or user-defined group of securities or other stock sets, at 442. Viewing options may be selected at 444. Viewing options may include time periods, frequency, indicators, moving day average, calculations, and other factors and events. Other historical data may be displayed graphically over various time periods, which may be defined by the user. Other charting capabilities may be invoked at 446.

Calendar display 450 may enable a client (or other user) to view upcoming financial and other events according to various factors (e.g., date, time, frequency, etc.) based on the assets in the user's portfolio, selected group of market securities or all market securities. For example, a user may view an events calendar for a defined set of securities, such as securities in the user's watchlist, a specific security, a selected group of securities, or all securities.

The calendar may provide event information at 452 which may include one or more of company name, company symbol (or other identifier), event date, event time, event description, link to event details and other information. The link to event details may connect the client to the event via the Internet and/or to the event's associated website. Also, the link may provide more detailed information about the event, contact and other information. Display options may be available, at 454. For example, events occurring on the current day (or other time period) may be highlighted to the user (e.g., displayed in particular manner or color).

Another embodiment of the present invention may provide enhanced client-advisor relationships by creating an environment for communication between a client and an advisor. Financial resources and various forms of data may be customized and accessed by users of the present invention. An advisor may access information related to a client's comprehensive financial situation through the aggregation feature of the present invention. For clients with more than one account, a comprehensive picture of the client's aggregated accounts may provide insightful information to the client's advisors. The present invention enables an advisor (or other authorized entity) the ability to view a selected client's aggregated information in varying levels of detail in different forms and formats for analysis and interpretation. The present invention further provides a communication and resource medium between a client and the client's one or more advisors.

The integrated support and information platform of the invention may provide multiple benefits and services. For example, account summary tools may enable the client and advisor to share access to a common client financial profile and other client information. This information may come from aggregation and manual input (for assets not "aggregatable") as well as other sources. The data may be granular down to sub-asset class levels.

Communication services may include services designed to increase client/advisor dialogue including 1 to 1 email, broadcast email (general and targeted), chat, live web events and customized reminders/alerts. A web portal or other access site may include comprehensive advisor contact information including chat availability, email, phone and mail information.

According to another embodiment of the present invention, a bulletin board (or other type of message panel) may be used to provide communication between (or among) advisors and clients. For example, a bulletin board may include a secure environment with various security features to enable users to post (or send) confidential information through the present invention. The bulleting board format may also allow advisors to view past correspondences through a discussion thread to enable advisors to understand the context of a question (or other inquiry) by a client. For example, an advisor may view the last several message leading up to the question for a comprehensive understanding of the client's situation.

In addition, the bulletin board (or other message panel) feature of the present invention may be integrated and routed to compliance entities to provide comprehensive advice based on privileged and/or confidential information. For example, the compliance entities may access the entire interchange, the relevant portions of the interchange, or a specific correspondence between advisor and client without having to actually contact either the advisor or client.

The present invention may also provide proprietary content to supplement traditional portal information and may be further customized to a client's needs and/or interests. Traditional content may include news, sport, weather, calendar, quotes, and market news. Proprietary content may include advisor research, equity selections, economic reviews, and content tailored and targeted to specific client needs (created and published by individual advisors) and/or interests.

Various resources may also be provided through the present invention, which may include an online version of the initial client questionnaire (that may be used to populate a financial profile and feed a financial plan) and a secure mailbox for the two-way distribution of forms and documents.

Figure 5:
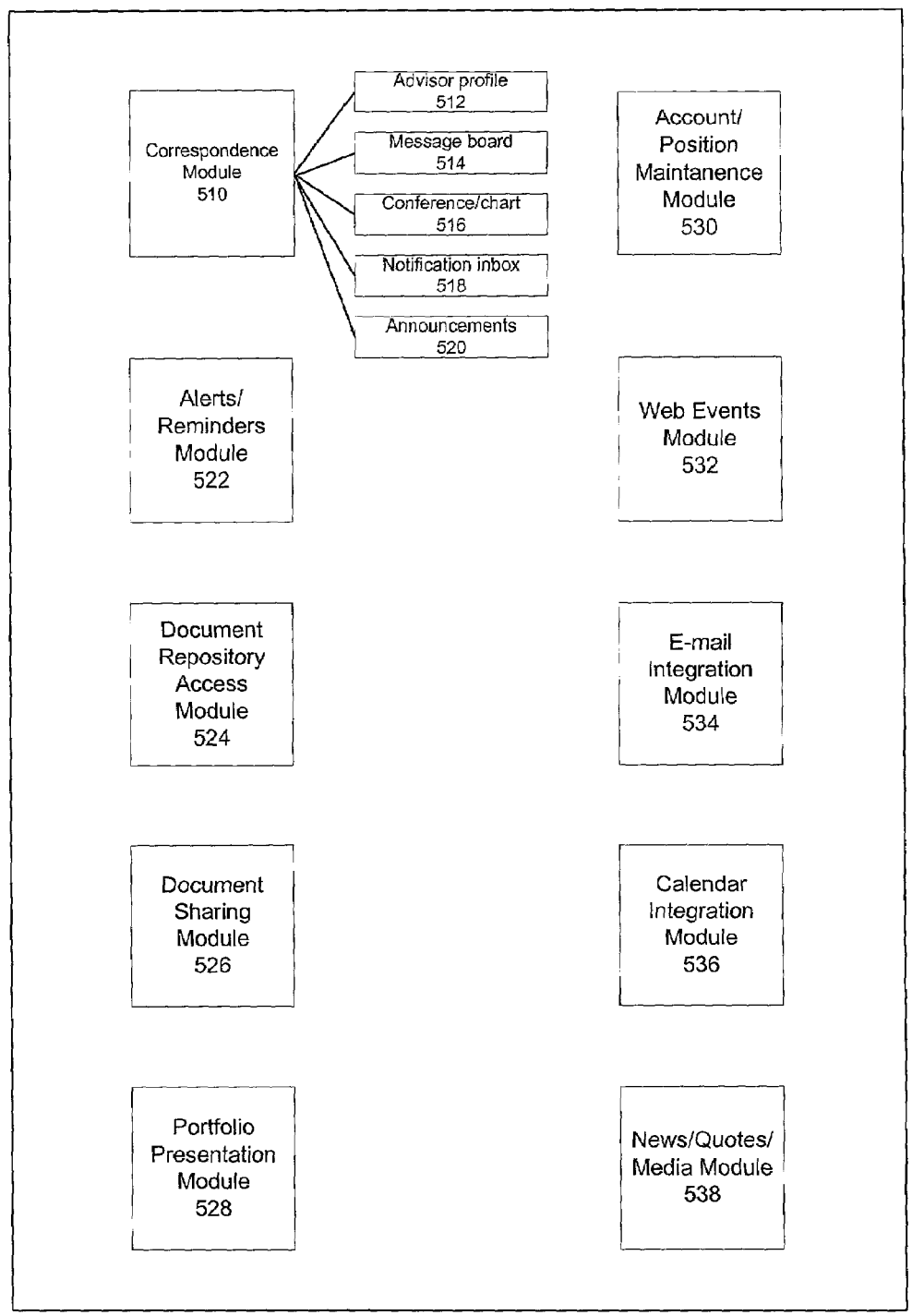
FIG. 5 is an example of a client portal, according to an embodiment of the present invention.

FIG. 5 is an example of a client portal, according to an embodiment of the present invention. Various viewing, correspondence and resource options may be available to a client through modules of the client portal, which may include one or more of correspondence module 510, alerts/reminders module 522, document repository access module 524, document sharing module 526, portfolio presentation module 528, account/position maintenance module 530, web events module 532, email integration module 534, calendar integration module 536, new/quotes/media module 538 and other modules and functions.

Correspondence module 510 may provide various types of communication options, such as advisor profile information 512, message board 514, conference/chat capabilities 516, notification inbox 518, announcements 520 and other communication options and functions. In addition, the correspondence module may further provide the ability to channel information to a segment of a business (such as the legal staff, compliance entity, etc.) for review and further correspondence.

Advisor profile information 512 may include personal and/or contact information for one or more advisors associated with a client. Other information may include relevant experience, associated accounts, a picture of an advisor and other information. Message board 514 enables a client and an advisor to correspond and share information by posting messages and other forms of information. A notification or other type of alert may inform the recipient when a new message is posted on the message board or other form of correspondence is established.

Conference/chat 516 may enable a client and an advisor to correspond in real time through a chat option, such as an instant messaging tool. According to an embodiment of the present invention, a client and an advisor may link to a video conference channel, for instance using RealVideo™ or other format, to effect a video conference during a consultation. In the operation of the invention, the client may access a web site, advisor page or other portals may be configured with network enabled code, which for instance may include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI) or other compilers, assemblers, interpreters or other computer languages or platforms.

A notification inbox 518 may provide a list of new or unread messages when the client accesses a client portal of the present invention. Other options may be available. For example, a user may attach a file to a message or reply. An indication of high importance or priority may also be displayed for a message or other notification. Users may download attachments from a message with an attachment. Also, users may specify in their respective profiles if the user wishes to receive all notifications, only priority notifications, only compliance officer rejection notifications and/or other user-defined types of notifications and/or messages. The notification inbox may serve as a repository for advisor notifications and other notifications.

Announcements 520 may enable a content manager (or other authorized entity) the ability to create informative announcements to be viewed by advisors and clients. A client directed content may appear on the client portal as well as an associated advisor's desktop. However, an advisor announcement may appear only on the advisor's desktop. Other restrictions may apply and other forms of correspondence between two entities may be implemented in accordance with the present invention. Various correspondence options may be available. For example, an advisor may have the ability to send a message to some or all clients in the advisor's domain.

According to an embodiment of the present invention, a compliance officer (or other entity) may review messages (e.g., message board posts, notifications, etc.) that an advisor sends (or otherwise makes available) before sending the message to the client. This feature of the present invention may be an option that may be selectable by a user. The compliance officer may approve, reject or hold the messages. If the message is rejected, an alert (or notification) may be sent to the originating advisor. Outgoing correspondences from the advisor may default to the compliance officer for review, unless otherwise indicated. When a compliance officer rejects a message it may be placed in a repository for the advisor to review. The compliance officer may include an explanation stating why the post was rejected. Incoming messages from clients to advisors may be copied to the compliance officer. According to another embodiment of the present invention, advisor client communications may be archived according to standard regulatory requirements and may be made retrievable.

Figure 6A:
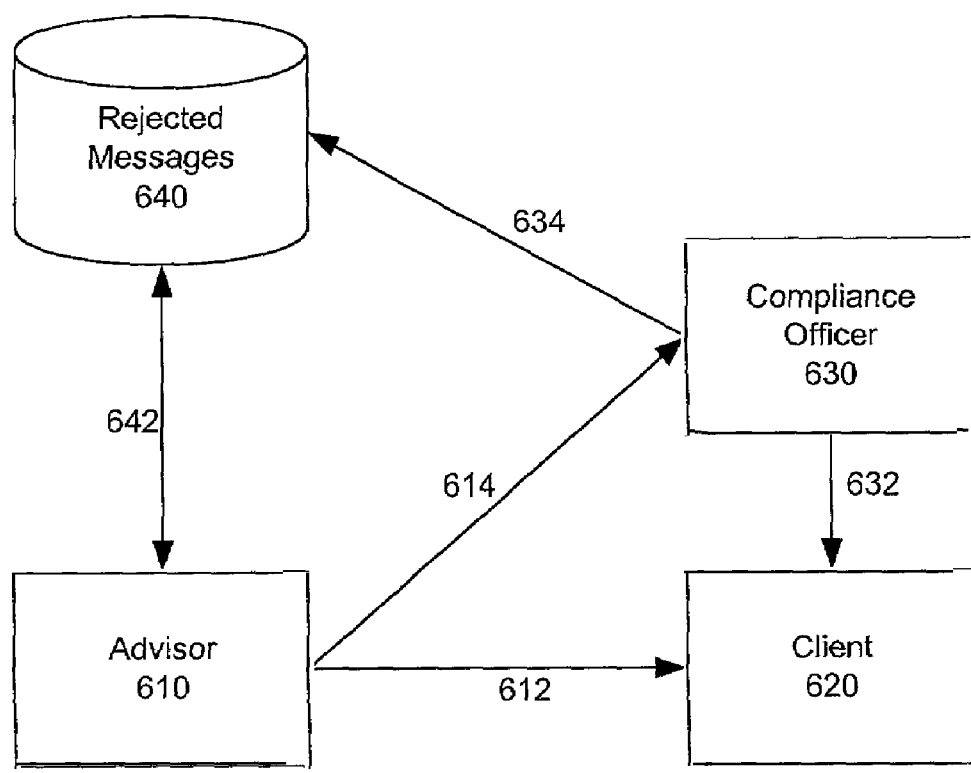
FIG. 6a is a diagram of an outgoing message, according to an embodiment of the present invention.

FIG. 6a illustrates an example of an outgoing message from an advisor to a client, according to an embodiment of the present invention. Advisor 610 may send a message intended for client 620 to compliance officer 630 for approval, via 614. Upon review and approval, compliance officer 630 may forward the message to client 620, via 632. However, upon review, compliance officer 630 may reject the message and send the rejected message to a repository for rejected messages at 640, via 634. Advisor 610 may be notified of the rejection (e.g., an alert or other notification) and may then view the rejected message at 640, via 642. Additional information (e.g., explanation) may be available as well. In addition, advisor 610 may bypass compliance officer 630 and send the message to client 620, via 612.

Figure 6B:
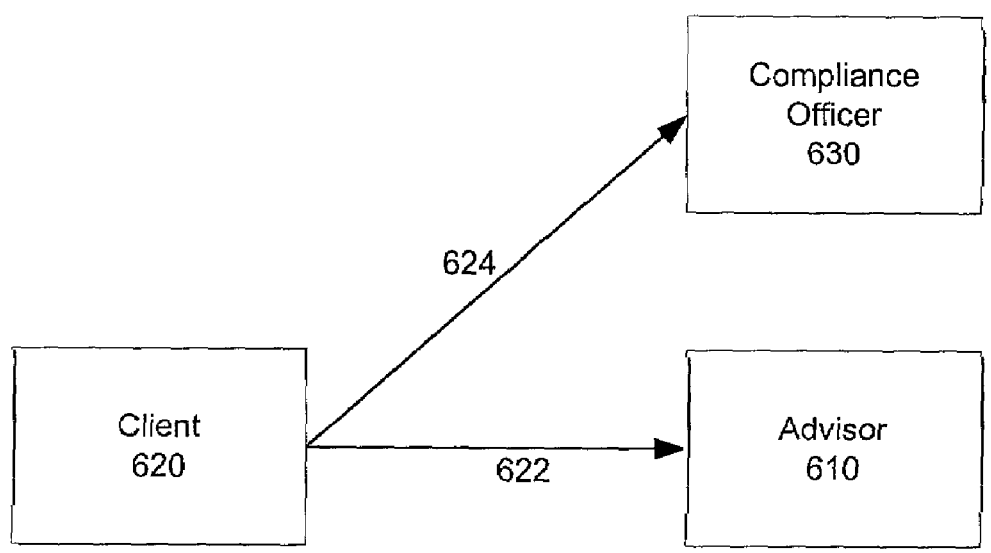
FIG. 6b is a diagram of an incoming message, according to an embodiment of the present invention.

FIG. 6*b* illustrates an example of an incoming message from a client to an advisor, according to an embodiment of the present invention. Client 620 may send a message to advisor 610, via 622. A copy of the message may also be made available to compliance officer 630, via 624. Thus, the compliance officer may view or otherwise access messages and/or other correspondences. The message may be stored and archived in accordance with regulations or other requirements. This enables incoming messages to be retrievable.

Alerts/Reminders module 522 may be used to notify clients and advisors of an occurrence of a particular event, which may be user defined. For example, advisors and clients may be notified that a new message has been posted on the message board. Also, an advisor may be notified that a client has changed profile information or made other modifications, additions, and/or deletions. In another example, an advisor may be notified that a compliance officer has rejected a post. Other triggering events may be defined by an advisor, client or other user of the present invention.

In addition, users may specify one or more modes of notification, which may include email, instant messaging, fax, wireless communication, pager, PDA, phone, cell phone or other forms of communication. Further, user's may specify particular modes of communication to certain alerts. For example, an advisor may designate notification via cell phone for certain events that an advisor may deem of particular importance. In the same example, other events may be notified by email.

Various links and other information may also be provided. For example, a client or advisor may click on a message notification link and be taken to the message (e.g., email, announcement, etc.) that elicited the notification. In another example, advisors may click on a compliance officer alert link and be taken to the message that was rejected by the compliance officer. In yet example, profile alerts may be for informational purposes only and may not be assigned an associated link. Other restrictions may be applied. Other variations and implementations may be used.

Document Repository Access module 524 may provide access to a collection of forms and documents for clients to access and download. The availability of documents and forms to the client on the client portal may be determined by an advisor or other authorized entity. Forms may include applications for various new accounts and/or other services and products.

The client and advisor may access a document sharing module 526 to share and/or exchange documents, spreadsheets, databases or other information on a live or offline basis. For example, an advisor may compose a document for a client's approval and enable the client to view and edit this document through the document sharing facility. The client may access the client portal and view the document through the document sharing facility. Upon review, the client may provide comments and modifications which may then be viewed by the advisor upon accessing the system. An accept or reject revisions feature may also be available to clients and/or advisors. For example, when viewing a document or other data, modifications made by a client may be highlighted in a certain manner (e.g., color, text, font, etc.) while modifications by a different entity (e.g., an advisor) may be displayed in a different manner.

In an embodiment of the present invention, the client may be provided with simultaneous access to an aggregate database and related information, for instance via a web page or other interface, so that the client and advisor may discuss or message concerning different account details and scenarios in real time. The client may use a workstation, network appliance, browser-equipped cellular telephone, or other wired or wireless access device. The client and advisor may use embedded links or other navigation tools to search, retrieve, model and perform other operations with respect to the client's information in the aggregate database.

Portfolio presentation module 528 may enable various types of aggregated account views. Views may include account balances view, net worth view, holdings by asset/subasset/sub asset class, account maintenance view and other views.

Account/position maintenance module 530 may provide the capability to add external accounts and to modify positions.

Web events module 532 may provide exclusive video productions for clients, which may also include personalized video productions which may be based on user profile and other user information.

Email integration module 534, calendar integration module 536, news/quotes/media module 538 and other functions may be integrated into the Web or other portal or interface presented to the client. The present invention may provide media content, resources and other information that may contain content relevant to wealth management and/or other areas of interest to the client. Features may include streaming video window, slide window and related document windows. Subject matter experts may deliver content relevant to one or more clients. Other information may include research, news, company information, product offers/news, alerts, service messages, etc.

Other options may include enabling a client to setup and manage bill payment service, through an embodiment of the present invention. For example, a client may be advised of a cost efficient manner for handling debts and making payments.

Figure 7:
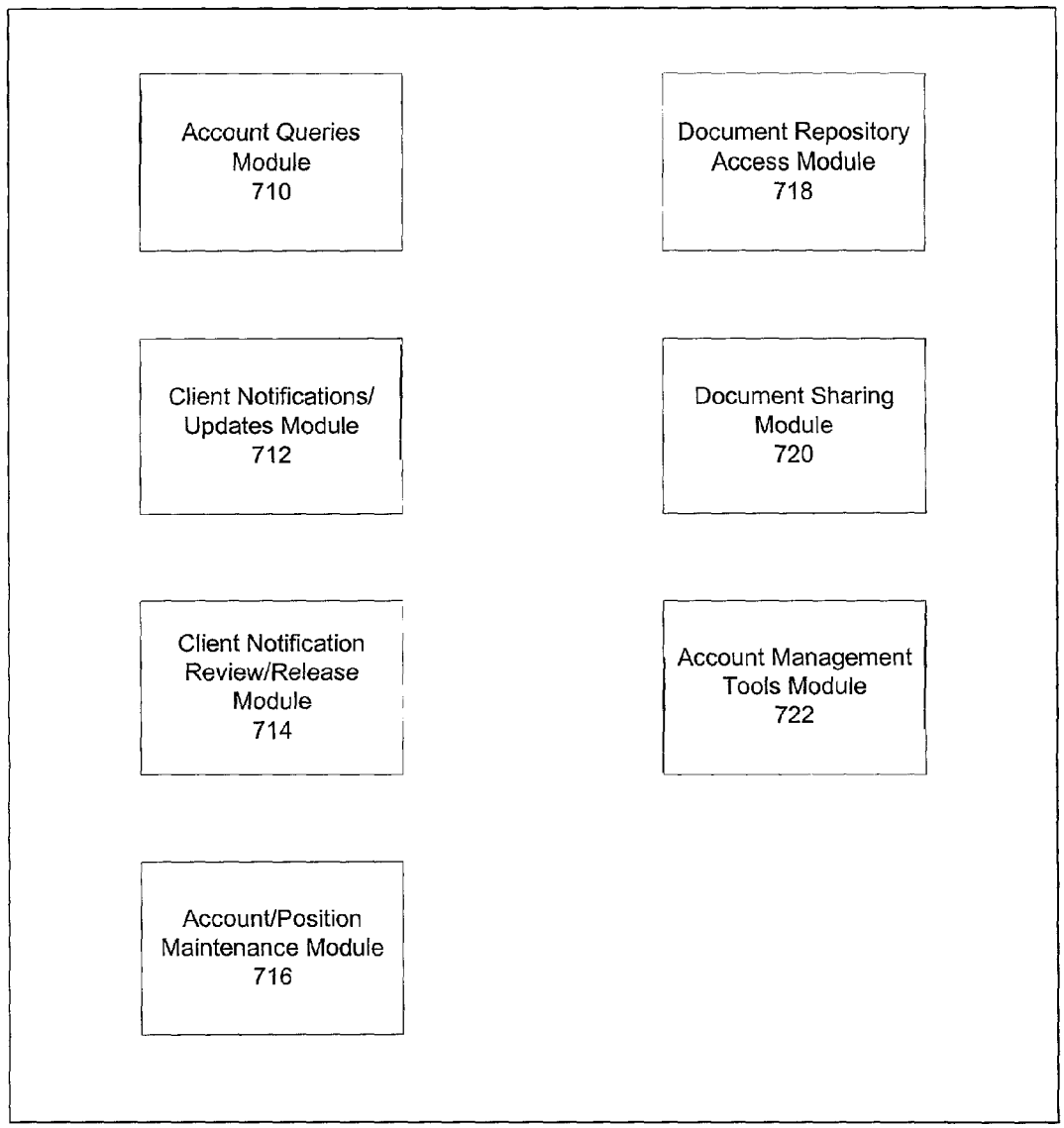
FIG. 7 is an example of an advisor desktop, according to an embodiment of the present invention.

FIG. 7 is an example of an advisor desktop, according to an embodiment of the present invention. Various managing, viewing, correspondence and resource options may be available to an advisor through modules of the advisor desktop, which may include one or more of account queries module 710, client notification/updates module 712, client notification review/release module 714, account/position maintenance module 716, document repository access module 718, document sharing module 720, account management tools module 722, and other modules and functions.

In an embodiment of the present invention, the advisor may be presented with predefined query sets to run against the client's aggregate portfolio, for instance "what if" or tax analyzers. Account queries module 710 may enable an advisor to query one or more databases to retrieve information regarding a particular client or groups of clients. For example, an advisor may use the account queries module to locate clients who own over a particular number of shares of a particular stock. Databases may include various information, such as data related to accounts, position, and profile.

According to an embodiment of the present invention, a predetermined set of queries may be applied in analyzing client data across aggregated account data, profile information and/or other data. The predetermined set of queries may be provided by the present invention thereby enabling advisors (or other authorized entities) the ability to select a query for application to one or more databases and/or other sources of information. Also, user defined queries may also be applied to gain specific insight and information regarding a specific inquiry and/or issue. Advisors may also have the ability to send a post (or other message) to all the results of the query or to a selected subset. Other variations may be implemented. In addition, navigation tools of the present invention may enable users to select an individual client and be taken to the message board of that client for personalized message or other form of correspondence.

According to an embodiment of the present invention, an advisor may query a client's aggregated financial data. For example, a client may desire to finance a family trip around the world or build an addition to the client's family home. The client may want to know the most efficient (e.g., cost effective) way to finance the trip or purchase. The advisor may analyze the client's aggregated financial data and determine whether the client should use funds from the clients 401K or borrow from one or more credit cards associated with the client, for example. By viewing and interpreting the client's comprehensive financial status, the advisor may provide a series of cost effective options to the client.

Client notification/updates module 712 may display inquiries from individual clients. For example, the advisor may be presented with a screen element representing an inbox communications channel, representing notifications and inquiries from clients received through various media.

Client Notification Review/Release Module 714 may allow a compliance entity to review some or all notifications.

Account/Position Maintenance Module 716 may provide the capability to add external accounts and to modify positions on behalf of a client.

Document Repository Access module 718 may contain a collection of forms and documents for clients and other entities to access and download. Document repository access module may store applications for various accounts, informative documents and others. For example, the advisor may access the document repository, e.g., for new account applications, to transmit to the client via email, fax, postal mail or other delivery channels.

The client and advisor may use a document sharing module 720 to share or exchange documents, spreadsheets, databases or other information on a live or offline basis.

Account management tools 722 may enable advisors to search, sort and display various client related information. Other operations and analysis may be performed as well. The search feature may enable the advisor to efficiently find a specific client from a list of all clients maintained by the advisor. The client sort feature may enable an advisor to narrow the field of clients shown on a client display based on a set of selected sort options. Sort options may be based on client segmentation schemes derived from the client profile or other source. The client display option may enable the advisor to select a client from the client list to view or manage data correlating to that client. Once the advisor (or other authorized entity) selects a client, the client's account information may populate the framed area of the portal where information, such as the client's name or other identifier, may be highlighted.

The advisor may be presented with various account management tools, such as tools to add, modify, delete or perform other operations to maintain the collection of accounts for that client, from external sources or from within the organization of the advisor. Security tools, such as tools to manage passwords, access privileges and other account variables, may also be presented to the advisor. Other modifications and operations may be accomplished through various account management tools and options.

Figure 8:
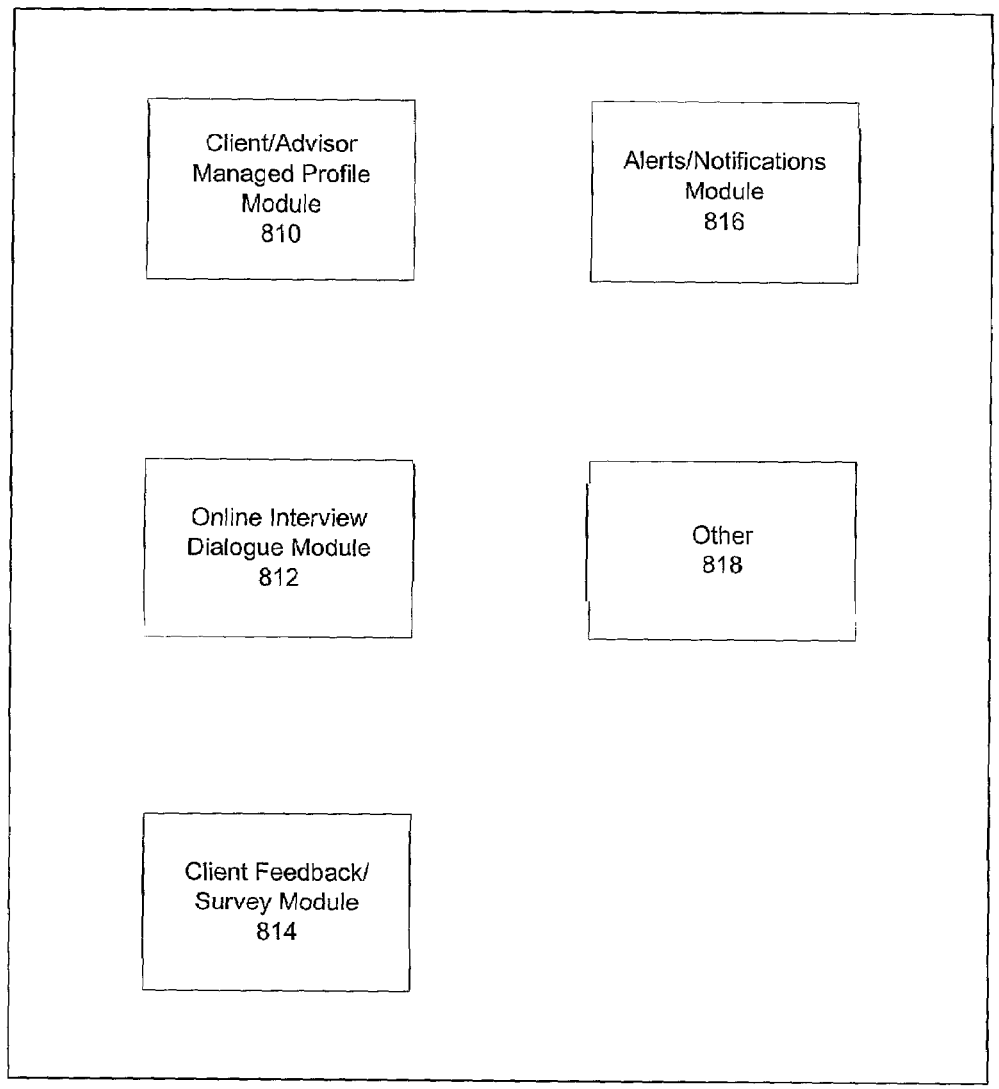
FIG. 8 is an example of a profile management module, according to an embodiment of the present invention.

FIG. 8 is an example of a profile management module, according to an embodiment of the present invention. Clients and advisors may have the ability to update profile information to reflect current conditions, recent developments and/or changes. For example, clients and advisors may have the ability to specify how they wish to be communicated with when a specified triggering event occurs (e.g., when a new message has been posted).

Various client profile options may include client/advisor managed profile module 810, online interview dialogue module 812, client feedback/survey module 814, alerts/notifications module 816 and other functions and options 818.

Client/advisor managed profile 810 may enable clients and advisors to maintain individual profiles indicating various information, such as account holding information, name, age, address, other personal information, media preferences and related information, activity or Web site history information and/or other information. A client interface may also include payment fields to permit payment of bills, additions to or exchanges between investments, and execution of other transactions online or offline.

Online interview dialogue module 812 may enable messaging, Internet telephony sessions with an entity (e.g., a customer service center) and other immediate communication options. This feature may enable live collaborative efforts.

A survey capability may be included to obtain market research from individual clients or groups of clients through module 814. Likewise, the advisor may be provided with configuration tools to set up broadcasts of selected or personalized information to clients having specific interests, such as stock holdings in various industries. Notification may be real time or offline and via different media, such as wireless telephone or pager messaging, email, or other channels or techniques.

Alerts/Notifications module 816 may enable clients and advisors to identify triggering events, methods of notification and other information. Client notifications or other updates may be programmed for individual clients, or groups of clients, or other user defined groups.

The foregoing description of the system and method for aggregate portfolio client support is illustrative, and variations in configuration and implementation will occur to persons skilled in the art. For instance, while various resources such as processing or database modules have been described as separate or discrete, in given implementations those resources could be combined or contained in single databases or other resources. Other resources described as singular could be distributed. Similarly, while the invention has generally been described in terms of financial data retrieval, other types of data and client relationships may be supported according to the invention. The scope of the invention is accordingly intended to be limited only by the following claims.

What is claimed is:

1. A method for facilitating an exchange of information between at least one client and at least one advisor, the method comprising the steps of:

accessing client data wherein the client data comprises an associated account portfolio and a client profile;

retrieving aggregated data from an aggregate database wherein the aggregated data is related to the associated account portfolio and wherein the associated account portfolio comprises account data from a plurality of accounts from a combination of independent sources;

analyzing the retrieved aggregated data in accordance with the client profile;

enriching the analyzed retrieved aggregated data by graphically displaying one or more of performance data, accuracy data, pricing data, benchmark data and historical data associated with the associated account portfolio; and communicating the analyzed retrieved aggregated data between the at least one client and the at least one advisor to enable the at least one client and the at least one advisor to collaborate on the analyzed retrieved aggregated data via an online interface over the Internet;

wherein the at least one client and the at least one advisor interact jointly with at least each other to access and exchange information related to the analyzed retrieved aggregated data;

wherein the at least one advisor is a human advisor.

2. The method of claim 1, wherein the at least one client and the at least one advisor collaborate simultaneously in real time.

3. The method of claim 2 wherein the plurality of accounts comprises one or more of cash accounts, demand deposit accounts, checking accounts, savings accounts, credit card accounts, loan accounts, investment accounts, trust accounts, brokerage accounts, securities accounts, real estate accounts, certificate of deposit accounts, risk management accounts, insurance accounts, derivatives and mortgage accounts.

4. The method of claim 1, wherein the retrieved aggregated data is further analyzed in accordance with at least one client input, wherein the at least one client input comprises a client initiated financial query related to the associated account portfolio.

5. The method of claim 1, further comprising the step of:
sharing at least one document related to the associated account portfolio between the at least one client and the at least one advisor wherein the document is viewed simultaneously.

6. The method of claim 1 further comprising the step of:
displaying the analyzed retrieved aggregated data based on display specifications which comprise at least one of client defined display specifications and default display specifications.

7. The method of claim 1 wherein the step of communicating comprises utilizing one or more of message boards, conference capabilities, notification inboxes, alerts, announcements, real time chats, and electronic messages.

8. The method of claim 1 wherein client profile comprises client data retrieved from client registration with one or more external channels.

9. A method for facilitating an exchange of information between at least one client and at least one advisor, the method comprising the steps of:

accessing client data wherein the client data comprises an associated account portfolio and a client profile;

retrieving aggregated data from an aggregate database wherein the aggregated data is related to the associated account portfolio and wherein the associated account portfolio comprises account data from a plurality of accounts from a combination of independent sources;

analyzing the retrieved aggregated data in accordance with the client profile; and communicating the analyzed retrieved aggregated data between the at least one client and the at least one advisor to enable the at least one client and the at least one advisor to collaborate on the analyzed retrieved aggregated data via an online interface over the Internet;

enabling the retrieval of personalized client account data from a personalized client portal wherein the account data contains information posted by the at least one advisor;

wherein the at least one client and the at least one advisor interact jointly with at least each other to access and exchange information related to the analyzed retrieved aggregated data;

wherein the at least one advisor is a human advisor.

10. A system for facilitating an exchange of information between at least one client and at least one advisor, the system comprising:

an access module for accessing client data wherein the client data comprises an associated account portfolio and a client profile;

a retrieving module for retrieving aggregated data from an aggregate database wherein the aggregated data is related to the associated account portfolio and wherein the associated account portfolio comprises account data from a plurality of accounts from a combination of independent sources;

an analysis module for analyzing the retrieved aggregated data in accordance with the client profile; and a communication module for communicating the analyzed retrieved aggregated data between the at least one client and the at least one advisor to enable the at least one client and the at least one advisor to collaborate on the analyzed retrieved aggregated data via an online interface over the Internet;

wherein the at least one client and the at least one advisor interact jointly with at least each other to access and exchange information related to the analyzed retrieved aggregated data;

wherein the at least one advisor is a human advisor; and wherein the analyzed retrieved aggregated data is enriched by graphically displaying one or more of performance data, accuracy data, pricing data, benchmark data and historical data associated with the associated account portfolio.

11. The system of claim 10, wherein the at least one client and the at least one advisor collaborate simultaneously in real time.

12. The system of claim 11 wherein the plurality of accounts comprises one or more of cash accounts, demand deposit accounts, checking accounts, savings accounts, credit card accounts, loan accounts, investment accounts, trust accounts, brokerage accounts, securities accounts, real estate accounts, certificate of deposit accounts, risk management accounts, insurance accounts, derivatives and mortgage accounts.

13. The system of claim 1, wherein the retrieved aggregated data is further analyzed in accordance with at least one client input, wherein the at least one client input comprises a client initiated financial query related to the associated account portfolio.

14. The system of claim 1, further comprising:
a document sharing module for sharing at least one document related to the associated account portfolio between the at least one client and the at least one advisor wherein the document is viewed simultaneously.

15. The system of claim 1, further comprising:
a personalized client portal for enabling the retrieval of personalized client account data wherein the account data contains information posted by the at least one advisor.

16. The system of claim 1 further comprising:
a display for displaying the analyzed retrieved aggregated data based on display specifications which comprise at least one of client defined display specifications and default display specifications.

17. The system of claim 1 wherein the communication module utilizes one or more of message boards, conference capabilities, notification inboxes, alerts, announcements, real time chats, and electronic messages.

18. The system of claim 1 wherein client profile comprises client data retrieved from client registration with one or more external channels.

* * * * *